W. DUNN.
Assignor to I. B. McQUESTEN.
Car-Coupling.
No. 8,467. Reissued Oct. 29, 1878.
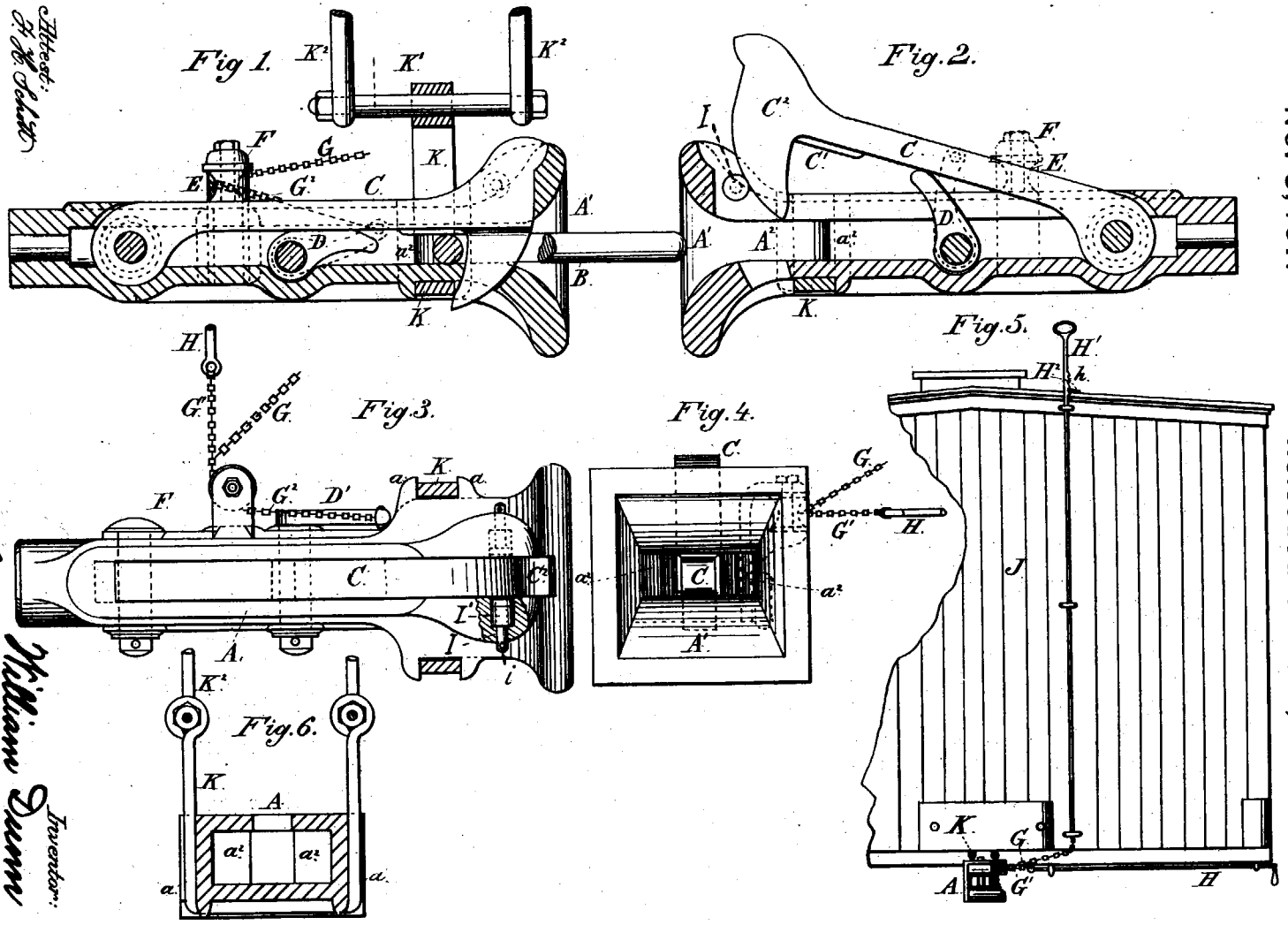
Attest:
F. H. Schott
Edwin James
Inventor:
William Dunn
Per Wm. H. Brereton
Attorney.
N. PETERS, PHOTO-LITHOGRAPHER, WASHINGTON, D. C.

UNITED STATES PATENT OFFICE.

WILLIAM DUNN, OF HAMILTON, ONTARIO, CANADA, ASSIGNOR TO ISAAC B. McQUESTEN, OF SAME PLACE.

IMPROVEMENT IN CAR-COUPLINGS.

Specification forming part of Letters Patent No. 198,972, dated January 8, 1878; Reissue No. 8,467, dated October 29, 1878; application filed September 9, 1878.

*To all whom it may concern:*

Be it known that I, WM. DUNN, of Hamilton, Ontario, Canada, but formerly of St. Mary's, Ontario, Canada, have invented certain new and useful Improvements in Car-Couplings; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to that class of self-acting car-couplings in which a pivoted hook-bar is used instead of a pin to secure the link to the draw-head.

It consists, first, in a peculiar construction of the coupling-hook, the same consisting of a long shank or bar with weighted hook-head, the point of which is made to project through the lower part of the draw-head, and provided on the under side of said bar, immediately in rear of the head and immediately over the location of the link, with a bearing-piece or enlargement made to extend downward below the upper part of the inside of the draw-head a sufficient distance to bear directly upon the link when the same is in position in the draw-head, as and for the purposes hereinafter more fully set forth and shown; second, in the means by which the crank-shaft to which the hook-bar-lifting mechanism is attached is operated from the top or either side of a car by a peculiar arrangement of chains, pulleys, and rods, making it unnecessary for the operator to pass between the cars to detach them when required; third, in the manner in which the draw-head is attached to the car at the front end, and in the provision made within the bell-mouth to insure a coupling; and, fourth, in the general combination and arrangement of the parts, all as and for the purposes hereinafter more fully set forth and claimed.

In the drawings, Figures 1 and 2 are longitudinal sections; Fig. 3, a plan; Fig. 4, an end view; Fig. 5, an end view of a car with coupling attached; and Fig. 6, a cross-section of a draw-head constructed according to my invention.

A is the draw-head, of somewhat the usual construction, provided with the bell-mouth A′, pivoted hook-bar C, and lifting-tongue D. D′ is the crank-arm, by which the rotation of the hook-bar is accomplished for the purpose of releasing the link. E is a friction-roller contained within the bracket F, attached to either or both sides of the draw-head, around which roller the chain $G^2$, attached to the crank-arm D′ and common to both chains G and $G^1$, passes. $H^1$ and H are hand-rods connected to the chains G and $G^1$, leading, respectively, to the top and either or both sides of the car, from any of which points the hook-bar can be operated equally well.

A feature specially advantageous in this construction is that the connection of the mechanism for uncoupling the draw-heads is rendered entirely independent of the jolting motion of the car. Were this not so the lateral motion incident to cars when running would be apt to uncouple the draw-heads.

The upper part of the rod $H^1$ is provided with notches *h*, which engage with a plate, $H^2$, for the purpose of holding the hook-bar up when it is desired to "shunt" cars.

The recess $A^2$ within the draw-head for the reception of the link is only of sufficient length to allow of proper clearances between the end of the link and hook. To insure correct action, shoulders $a^2$ are provided, against which the end of the link strikes, thus preventing it being shoved too far into the draw-head when the projected end of the link comes in contact with the pivoted hook contained in a corresponding draw-head. The provision made by the shoulders $a^2$ compels the link to press against the outer inclined face of the hook of an approaching draw-head, thereby raising it up and allowing the end of the link to pass underneath and behind it, when the hook, by the aid of its weighted head $C^2$, falls promptly into the central space of the link, thus securely fastening the contiguous draw-heads together.

The hook-bar is constructed of a long shank or bar, C, pivoted in the rear central portion of the draw-head, and provided at the front end with a large weighted hook-head, $C^2$, which fits down into a correspondingly-formed recess in the draw-head. The lower end or hook of the head is somewhat prolonged or lengthened, and passes through an aperture formed for the purpose in the lower part of the draw-head. Immediately behind the hook-head on the under face of the bar is formed an enlargement or projection, $C^1$, for the purposes hereinafter more fully described.

I I are spring-blocks, placed at right angles to the sides of the hook-bar near the front end. They are provided with rounded faces, and are forced outwardly a suitable distance by the springs I′ I′ pressing against the head and the face of the recess, the extent of their action being controlled by the pins *i*. These blocks also act as a check to prevent the rise of the hook-bar by the jolting of the cars. It has been found, however, that in ordinary cases the weight of the head alone is sufficient to hold the hook down in place; therefore these springs may be dispensed with.

K is a stirrup passing under and supporting the front end of the draw-head. The ends of the stirrup are connected to and slide upon horizontal bars $K^1$ $K^1$, which bars are attached to the front ends of the car by the suspension-rods $K^2$, or their equivalent. The side and under faces of the draw-head are provided with projecting strips *a*, within which the stirrup is contained.

The objects and advantages of constructing the hook-bar as hereinbefore described may be briefly set forth as follows:

First. It is weighted at the head $C^2$ for a threefold purpose—first, to resist its rising by the concussion or jolting of the cars; second, to make it positive in action; and, third, to counterpoise the projecting end of the link.

Second. The bearing-piece $C^1$, provided on the under side of the hook-bar, immediately over the location of the link and immediately in rear of the hook, and extending below the upper part of the interior of the draw-head, is for the purpose of holding the link always on or nearly on a level. This bearing-piece $C^1$ is made to project downward a sufficient distance, so as to bear directly upon the coupling-link when the same is in position in the draw-head. Thus the link is securely clamped between the hook-bar and the bottom of the draw-head, and by means of the equipollent head $C^2$ is at all times held in a horizontal position. This bearing-piece $C^1$ is for the further purpose of securing the entrance of the projecting end of the link into the mouth of the draw-head with which a coupling is intended. The object sought in this construction is to poise the link when at rest to insure coupling, at the same time not holding it rigidly. This is accomplished by having the intervening space between the upper and lower part of the draw-head greater than that between the bottom of the draw-head and the bearing of the bar; hence when an undue strain is brought to bear on the link from the undulating motion of the cars, difference in height, or any other cause, the space in the draw-head allows the link to be elevated or depressed, as may be necessary, the hook-bar yielding to circumstances by slightly rotating, and the end of the link will at all times be found in the acute angle of the hook and touching the bearing $C^1$.

Third. The hook-bar is so constructed as to allow the point of the hook to pass in and through an aperture formed for the purpose in the bottom of the draw-head, this last-mentioned provision being for the purpose of preventing the possibility of the link being drawn out of the draw-head on a slight uplifting of the hook-bar, whereas, if the point of the hook merely reached to and rested on the bottom of the draw-head, the link would be released by the slightest rotation of the hook-bar.

Having thus described my invention, what I claim as new, and desire to secure by Letters Patent, is—

1. In combination with the draw-head A, with shoulders $a^2$ formed therein, the long hook-bar C, made to pass through the lower part of the draw-head, and constructed with the weighted head $C^2$ and enlargement $C^1$ immediately in rear of the head, made to extend downward, so as to bear directly upon the link when the same is in position in the draw-head, as and for the purpose described.

2. The hand-rods H and $H^1$ and chains G, $G^1$, and $G^2$, in combination with the friction-roller E and crank-arm D′, arranged and operating substantially as described, and for the purpose specified.

3. The stirrup K, supported upon the horizontal bars $K^1$, in combination with the draw-head A, provided with the projecting strips *a*, substantially as described.

4. The combination, in a car-coupling, of draw-head A, shoulders $a^2$, weighted hook-bar C $C^2$, made to pass through the lower part of the draw-head, bearing-piece $C^1$, made to project downward a sufficient distance to bear directly upon the link for the purpose of holding it in a level position, and lifting-tongues D D′, all constructed, arranged, and adapted to operate substantially as and for the purposes described.

In testimony that I claim the foregoing I have hereunto set my hand this 30th day of August, 1878.

WM. DUNN.

Witnesses:
EDWARD C. SWANN,
J. B. GORDON.